(12) United States Patent
Brandon

(10) Patent No.: US 6,575,839 B1
(45) Date of Patent: Jun. 10, 2003

(54) HEAVY DUTY QUILL ASSEMBLY FOR A LAWN MOWER

(76) Inventor: Dennis Brandon, 300 Freehill Rd., Hendersonville, TN (US) 37075

( * ) Notice: Subject to any disclaimer, the term of this patent is extended or adjusted under 35 U.S.C. 154(b) by 13 days.

(21) Appl. No.: 09/800,967

(22) Filed: Mar. 7, 2001

(51) Int. Cl.$^7$ ................................................ F16D 3/84
(52) U.S. Cl. ......................... 464/178; 56/255; 56/295
(58) Field of Search .................. 464/178, 177; 277/411, 412, 418, 419, 421, 549, 634, 585; 384/126, 144, 480, 101; 561/10.8, 295, 255, DIG. 17; F16C 9/03

(56) References Cited

U.S. PATENT DOCUMENTS

| | | | | |
|---|---|---|---|---|
| 3,908,344 A | * | 9/1975 | Zurek et al. | 56/11.3 |
| 4,084,397 A | * | 4/1978 | McGrath | 56/255 |
| 4,344,659 A | * | 8/1982 | Shimano | 308/187.1 |
| 4,478,029 A | * | 10/1984 | Moore et al. | 56/17.5 |
| 5,481,857 A | * | 1/1996 | Umemoto et al. | 56/12.6 |
| 5,507,586 A | * | 4/1996 | Myszka | 403/365 |
| 5,669,213 A | * | 9/1997 | Britton | 56/17.5 |

OTHER PUBLICATIONS

Housing drawings for AYP quill assemblies.
Shaft drawings, along with other various components for the AYP quill assemblies and a sample assembly.
Shaft drawings for MTD quill assemblies; and.
Drawing for Murray quill assembly other than the "Heavy Duty Quill Assembly".

* cited by examiner

Primary Examiner—Lynne H. Browne
Assistant Examiner—Michael P Ferguson
(74) Attorney, Agent, or Firm—W. Edward Ramage; Dinsmore & Shohl LLP

(57) ABSTRACT

A quill assembly for transmitting power from a belt drive to a lawn mower blade has a jackshaft positioned within a central bore of a housing. A blade adapter is recessed into the bottom of the housing to form a bearing seal and position the blade. A pulley adapter is positioned against the top of the housing and has a center section surrounded by a resilient outer section. The outer section of the pulley adapter includes a lip that fits into a groove formed in the outside of the housing to seal the housing around the top bearing.

10 Claims, 15 Drawing Sheets

VIEW C-C

VIEW B-B

A

HEAVY DUTY QUILL ASSEMBLY FOR A LAWN MOWER

BACKGROUND OF THE INVENTION

The present invention relates generally to lawn mowers having an engine powered rotary cutting blade. More particularly, this invention pertains to powered lawn mowers wherein the rotary cutting blade is mechanically coupled to the engine using a belt-driven quill assembly.

Quill assemblies are commonly used in lawn tractors and other powered lawn mowers to connect to an engine powered v-belt drive and transmit power through a vertical jackshaft to a mower blade. Such quill assemblies will typically have a bearing at the top of the assembly near the v-belt pulley and at the bottom of the assembly near the blade. During use of the mower, the top bearing is exposed to water damage and the bottom bearing is affected by debris thrown upward from the blade. Also, the spacing of these bearings must be carefully controlled so that the pulley and blade are fixed in the proper vertical position. This vertical positioning is often provided in the prior art by the use of separate spacers. Unfortunately, the use of spacers increases the risk that the bearings will be side pre-loaded during assembly of the mower, making them susceptible to premature failure.

Another problem with conventional quill assemblies is that the jackshafts often have a uniform diameter along their length. When the mower blade strikes a foreign object, a large bending force is transmitted to the jackshaft. When the jackshaft bends, the housing can crack or fracture and pieces can be thrown as dangerous projectiles from the mower.

Prior art quill assemblies are also difficult to assemble because the jackshaft and blade adapter would easily fall out of the assembly during production of the mower.

What is needed, then, is a quill assembly for a lawn mower that provides protection against water and debris entering the bearings, that does not require separate spacers to position the pulley and blade, that resists damage caused by bending of the jackshaft, and is easy to assemble into a lawn mower.

SUMMARY OF THE INVENTION

One object of the present invention is to provide a quill assembly that incorporates auxiliary sealing components for the bearings at the pulley and blade ends of the assembly.

Another object of the invention is to eliminate the need for using spacers in a quill assembly to position the bearings, blade and pulley.

A further object of the invention is to prevent axial pre-loading of the quill assembly bearings during assembly of the lawnmower.

Yet another object of the invention is to provide a quill assembly that is easy to install into a lawnmower.

These and other objects are achieved by a quill assembly for use in a lawn mower for transferring power from a belt drive connected to a pulley at the top of the assembly to a rotating cutting blade connected at the bottom of the assembly. The quill assembly includes a housing having a central bore extending from a top of the housing to a bottom of the housing, a bottom bearing supported by a seat within a bottom bearing bore at the bottom of the housing, a top bearing having an outer ring supported by a seat within a top bearing bore at the top of the housing and an inner ring supported by a shoulder on a jackshaft, a jackshaft having an enlarged center portion positioned within the bore of the housing and supported for rotary operation by shouldering the top and bottom bearing inner rings, with the blade end of the jackshaft extending from the bottom of the housing and a pulley end of the jackshaft extending from the top of the housing, a pulley adapter adjoining the top of the housing, the pulley adapter having a center section with an central bore positioned around the pulley end of the jackshaft in a slip-fit engagement and an adjacent outer section with a flexible outer lip extending over and sealing the top of the housing, and a blade adapter recessed into an adapter counter-bore at the bottom of the housing, the blade adapter having a central splined bore surrounding the blade end of the jackshaft.

In one embodiment of the invention, the blade adapter counter-bore is larger than the bottom bearing bore such that the blade adapter engages the housing to form a seal for the bottom bearing.

Preferably, the quill assembly also includes an annular groove formed around the housing proximate the top of the housing, the groove receiving the outer lip of the pulley adapter.

The top bearing bore has a diameter sized to define a slip fit engagement between the top bearing and the top bearing bore whereby the top bearing floats within the top bearing bore. The center portion of the jackshaft has a larger diameter than the blade and pulley ends to form top and bottom shoulders on the jackshaft that support respective inner rings of the top and bottom bearings.

The top and bottom shoulders on the jackshaft are positioned at predefined locations along the jackshaft such that the top and bottom bearings are supported at predefined vertical positions along the jackshaft without the use of separate bearing spacers. The center section of the pulley adapter extends upwardly from the top of the housing to support the pulley at a pre-defined vertical position above the assembly without the use of a separate pulley spacer.

BRIEF DESCRIPTION OF THE DRAWINGS

FIG. 16 is an exploded view of a typical lawnmower blade housing having three rotary cutting blades operatively connected to a v-belt drive unit using three conventional quill assemblies.

DESCRIPTION OF THE PREFERRED EMBODIMENTS

Figure 1:
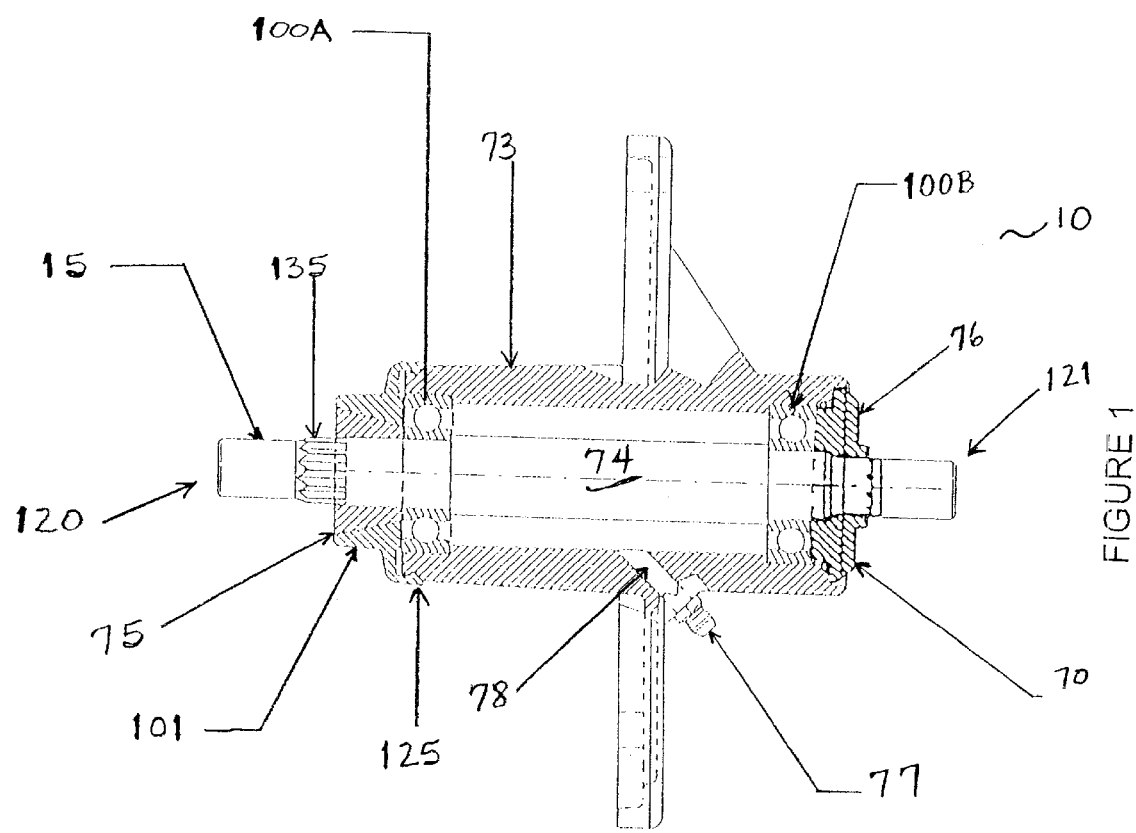
FIG. 1 is a cutaway side view of the quill assembly of the present invention.
Figure 2:
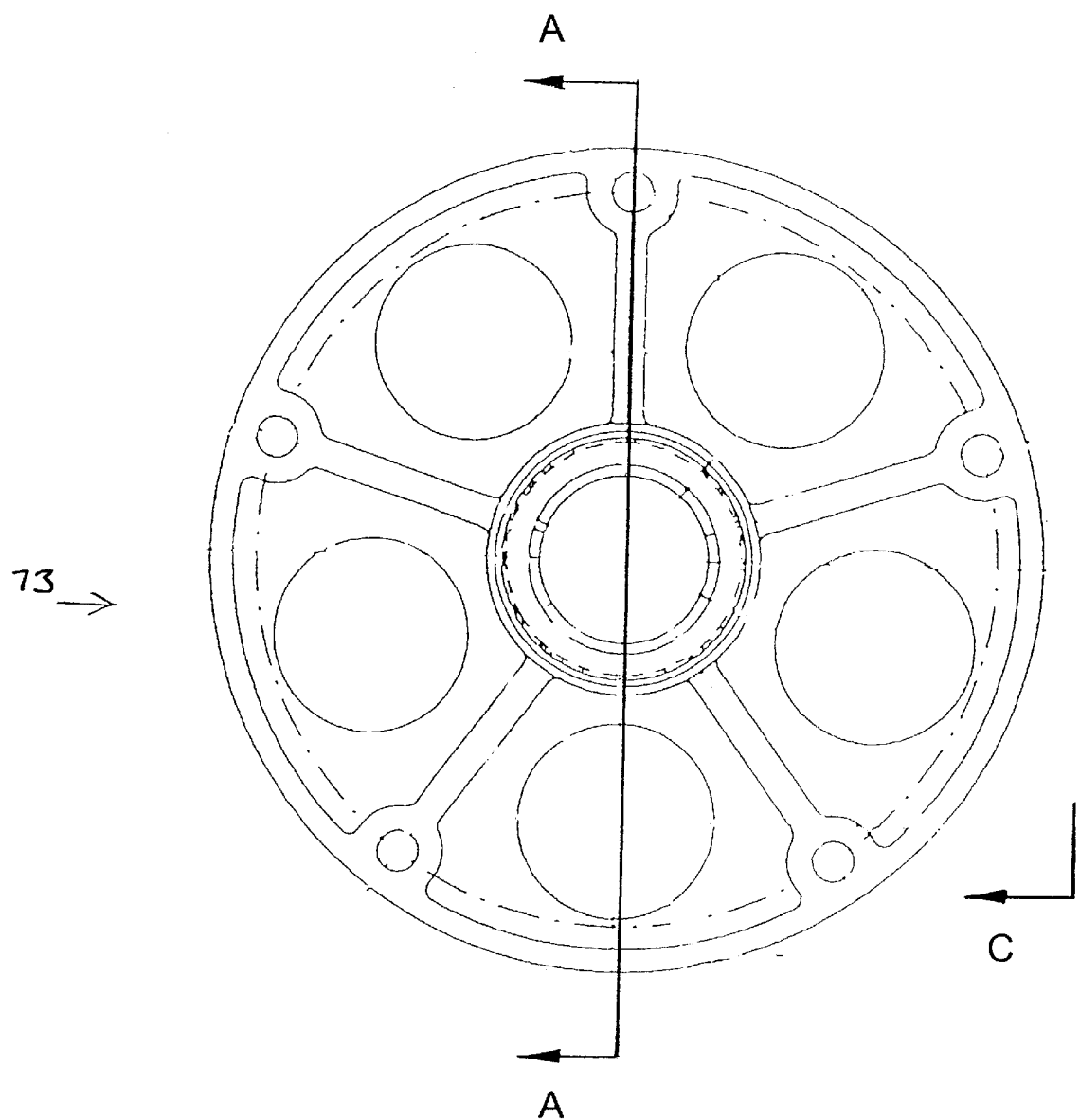
FIG. 2 is top view of the quill assembly housing.
Figure 3:
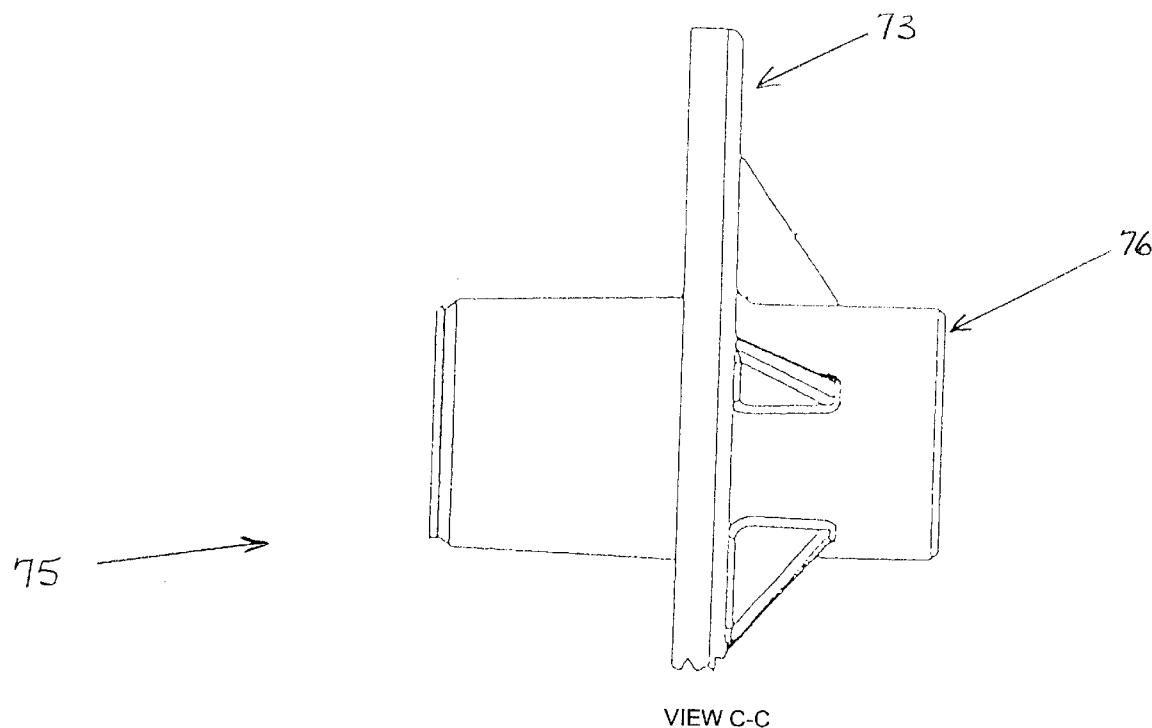
FIG. 3 is a side view of the quill assembly housing taken along line C—C of FIG. 2.
Figure 4:
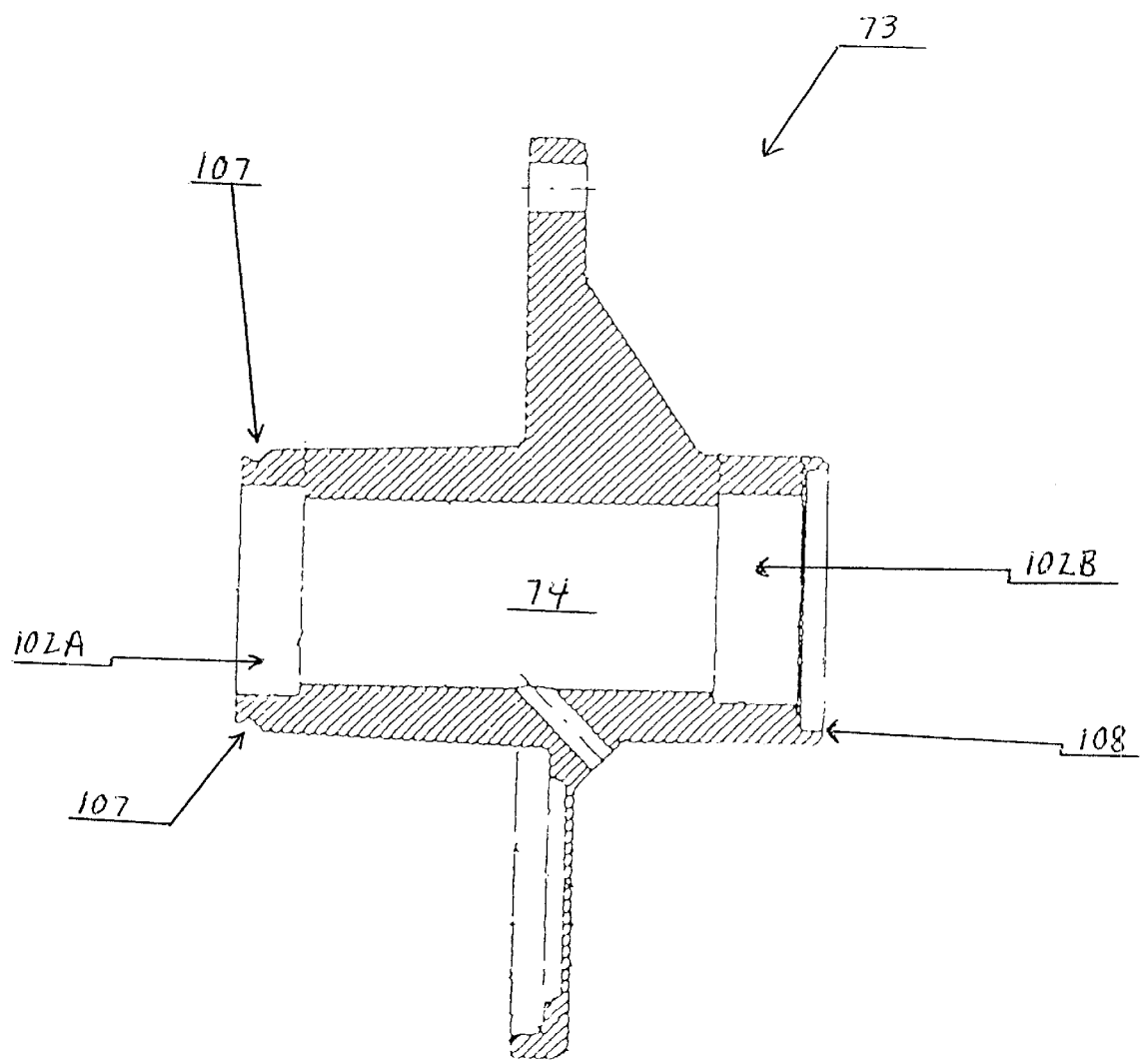
FIG. 4 is a sectional view of the quill assembly housing taken along line A—A of FIG. 2.
Figure 5:
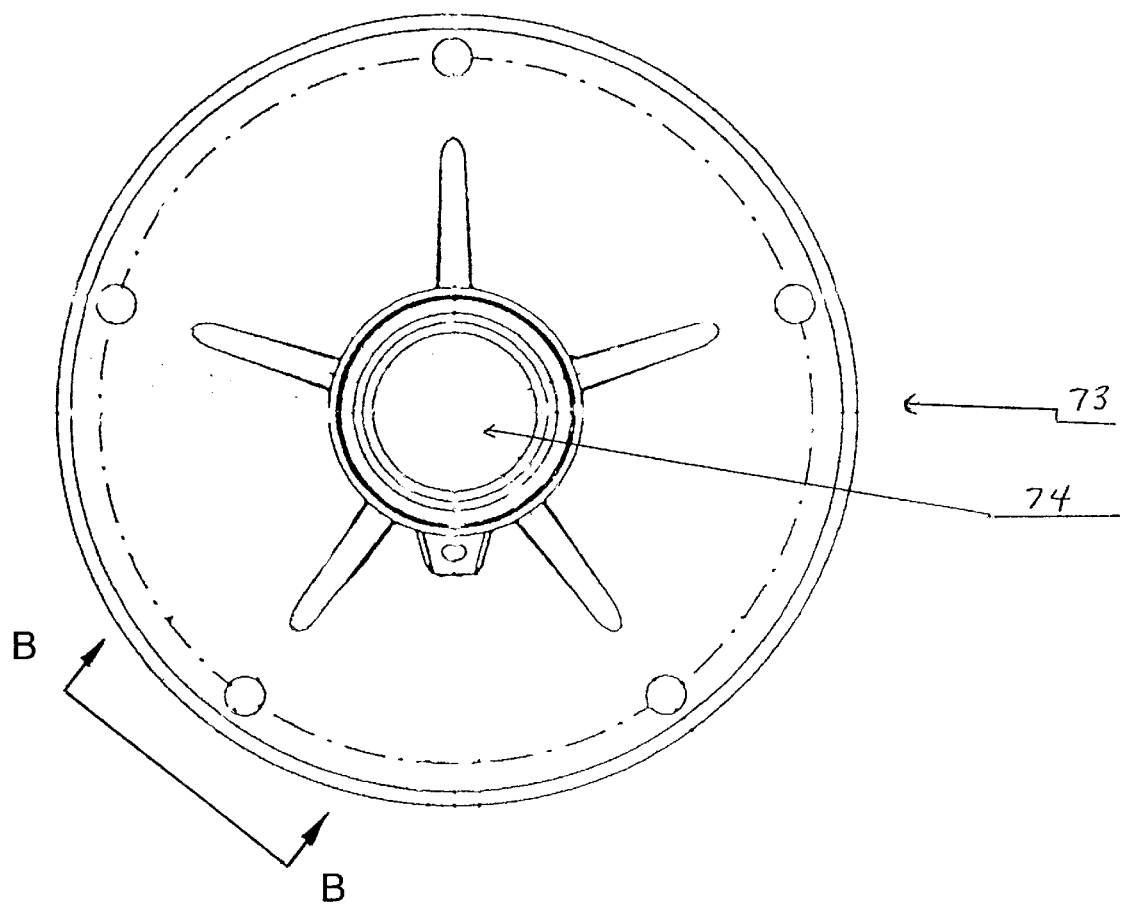
FIG. 5 is a bottom view of the quill assembly housing.
Figure 6:
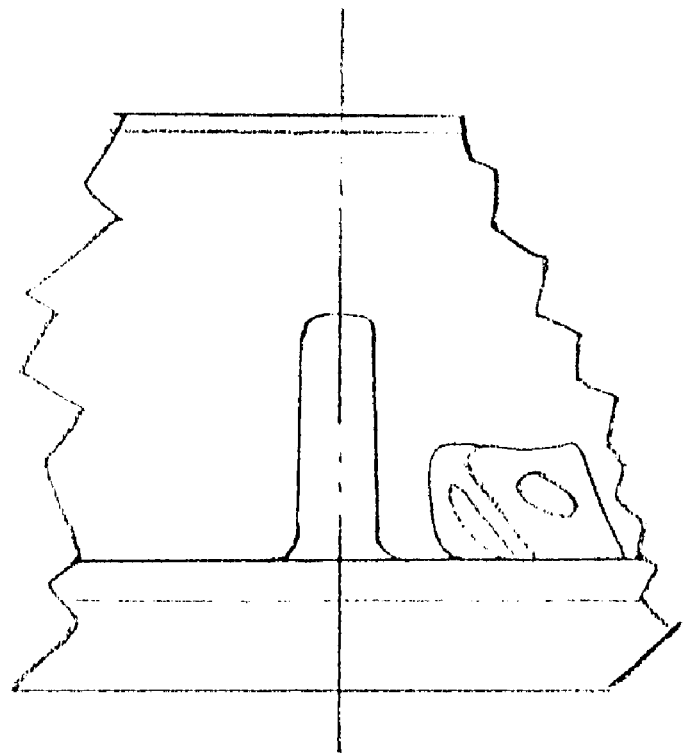
FIG. 6 is a sectional view of a portion of the quill assembly housing taken along line B—B of FIG. 5.

The quill assembly 10 of the present invention is shown in a side cutaway view in FIG. 1. A housing 73 has a central bore 74 extending from a top end 75 (pulley end) to a bottom end 76 (blade end) of the housing 73. A grease passage 78 extends outwardly from central bore 74 to a grease nipple 77. A jackshaft 15 is positioned within the central bore 74 of the housing 73, supported by a top bearing 100A and bottom bearing 100B. The pulley end 120 of the jackshaft 15 extends upwardly through a pulley adapter 101 and away from the housing 73 so that it can engage and receive power from a mower engine and conventional belt drive mechanism attached to a mower blade housing (not shown). The blade end 121 of the jackshaft 15, in turn, extends downwardly through a blade adapter 70 and away from the housing 73 to transmit engine power to a mower blade.

FIGS. 2–6 provide additional detail about the housing 73. A top bearing bore 102A is machined into the top end 75 of the housing 73 to support the outer ring 104 of top bearing 100A. The diameter of the top bearing bore 102A is greater than the diameter of the center bore 74 of the housing 73 to form a seat for the top bearing 100A outer ring 104. In a preferred embodiment of the invention, the top bearing bore 102A has a diameter selected to create a slip fit with the top bearing 100A that conforms closely to an #6 housing bore fit. This allows the top bearing 100A to float or move inside the bore 102A rather than to be fixed in place, thereby maintaining the inner rings 103 and outer rings 104 (FIGS. 9 and 10) of the bearings 100A, B in proper alignment. This feature helps to avoid failures that have occurred in prior art designs due to axial pre-loading of the bearings during the pressing operation and/or installation.

Similarly, a bottom bearing bore 102B is machined into the bottom end 75 of the housing 73 to receive the bottom bearing 100B. The diameter of the bottom bearing bore 102B is also greater than the diameter of the center bore 74 of the housing 73 to form a seat as well for the bottom bearing 100B. The bottom bearing bore 102B preferably has a diameter selected to create press fit with bottom bearing 100B which conforms closely to an M7 housing bore fit. This maintains the bearing position in the bore 102B to insure the proper position of the bearing 100B, blade adapter 70, and blade (not shown), because maintaining the proper blade height is critical. This design also maximizes the overall length of the housing 73 from top bearing bore 102A to bottom bearing bore 102B to allow for added stability. The actual dimensional positions of the bearing bores 102A and 102B are dictated in each case by the vertical positions of the blade and pulley.

Proximate the top end 75 of the housing 73, a groove 107 (FIG. 4) is machined into the outside surface. As best seen in FIG. 1, the rubber lip 125 of the pulley adapter 101 rides inside this groove 107.

At the bottom end 76 of the housing 73, a counter bore 108 is provided to allow the blade adapter 70 to recess into the housing 73.

The top bearing 100A is located in the housing 73 so that the bearing inner ring 103 fits against shoulder 105A (FIG. 7) on the jackshaft 15. Accordingly, the lateral position of the jackshaft 15 is governed by the inner ring 103 of the bottom bearing 100B.

Figure 7:
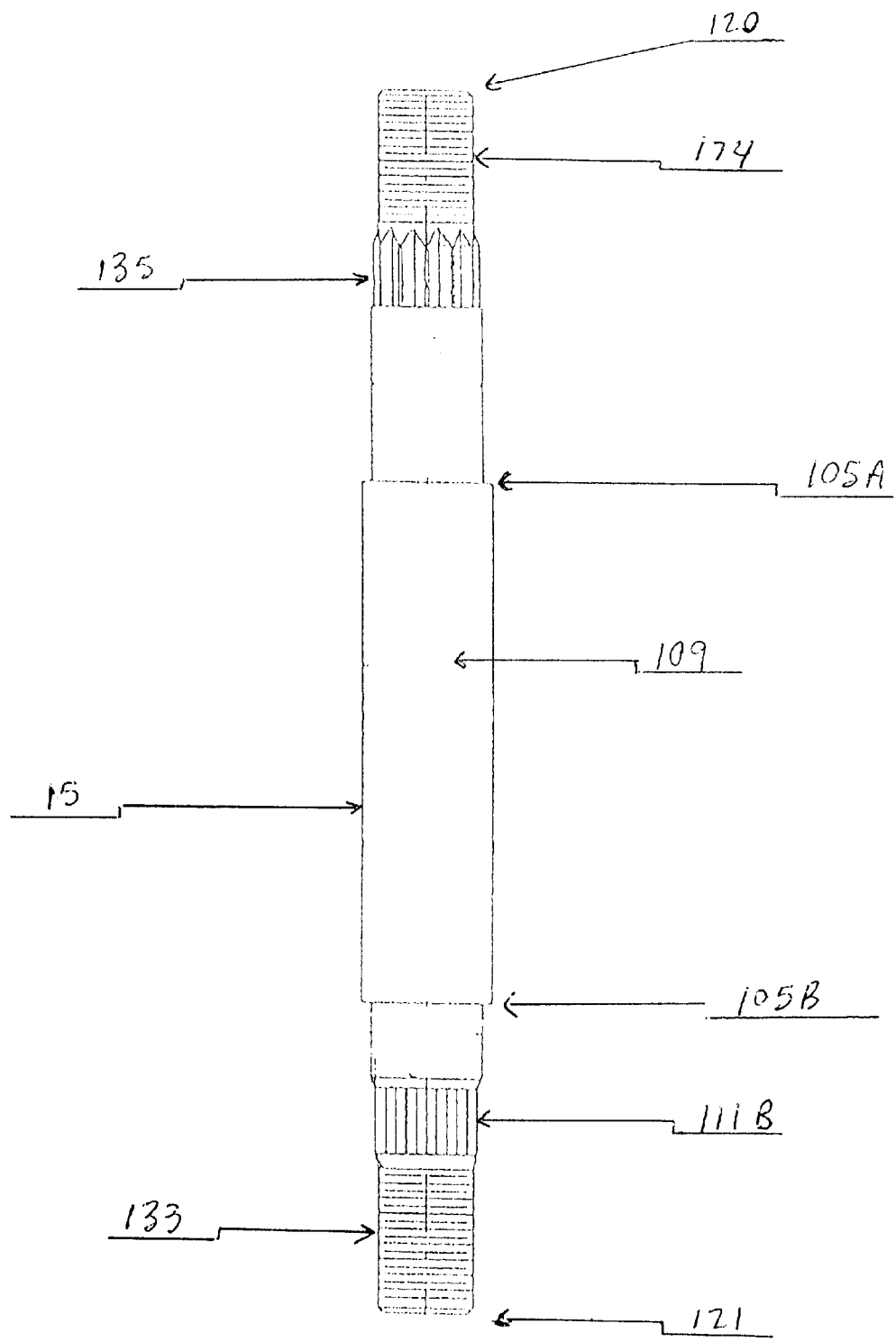
FIG. 7 is a side view of the jackshaft.
Figure 8:
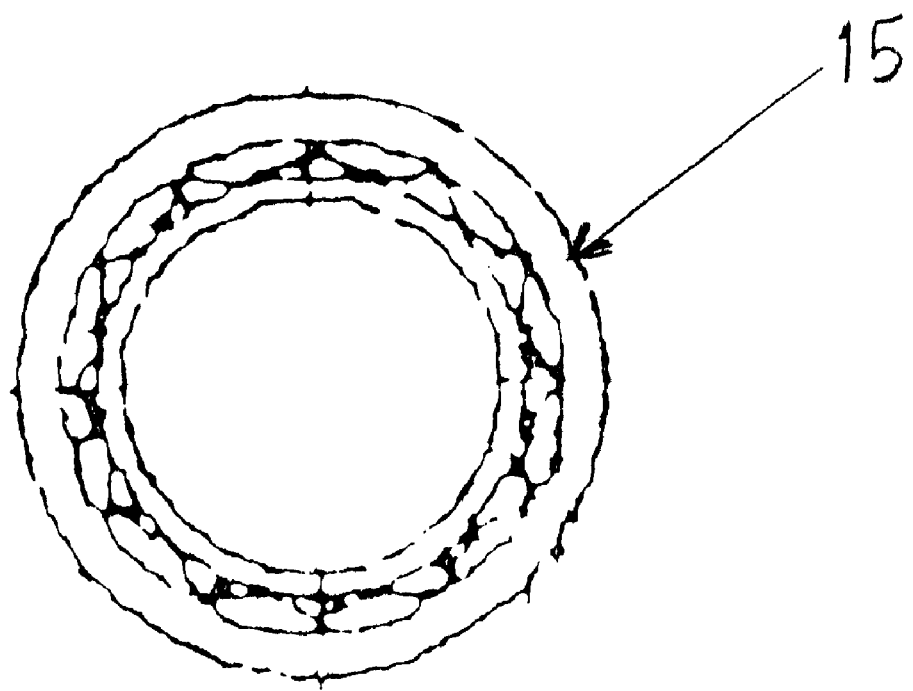
FIG. 8 is a top view of the jackshaft of FIG. 7.

The jackshaft 15 is shown in greater detail in FIGS. 7 and 8. The center portion 109 of the jackshaft 15 has a larger diameter compared to conventional jackshafts that provides added strength and that define shoulders 105A and 105B at the pulley and blade ends 120, 121 of the jackshaft 15 respectively. The shoulders 105A and 105B act as bearing seats for bearings 100A and 100B. Specifically, the shoulder 105A supports the inner ring 103 of top bearing 100A. The added strength of the jackshaft 15 helps reduce the bending of the shaft 15 when the mower blade strikes foreign objects. This bending normally causes vibrations and can also cause a quill assembly housing to crack. In severe cases the housing will break and housing particles can be thrown.

The shoulders 105A and 105B (functioning as bearing seats) on the jackshaft 15 eliminate the need for the spacers between the bearings 100A and 100B. In the present invention, the tightening of the pulley and blade nuts (not shown) will result in pulling the inner rings 103 of the bearings 100A and 100B against the jackshaft shoulders 105A and 105B and into their correct position. By comparison, spacers are currently used on most prior art quill assemblies. When the inner rings of the bearings in such conventional assemblies are pressed-in until contact was made with a spacer, the spacer position is difficult to maintain, as well as the proper pressure required to press the bearings in to the correct position. Also, the bearing seats formed by the shoulders 105A and 105B, combined with the floating bearing position on the top end 75 of the housing 73, will eliminate any axial pre-loading condition.

The blade end 121 of the jackshaft 15 includes a splined portion 111 adjacent to threaded portion 133. The pulley end 120 also has a gear tooth portion 135 adjacent to threaded portion 134.

The design of the present invention will also allow the jackshaft 15 to be installed into the housing 73 during bearing installation. Most prior art jackshafts are added to the assembly subsequent to bearing installation, which allows the jackshaft to easily fall out of the assembly. The jackshaft 15 of this assembly 10 will not fall out, making it easier to handle during the production of the lawnmower.

Figure 9:
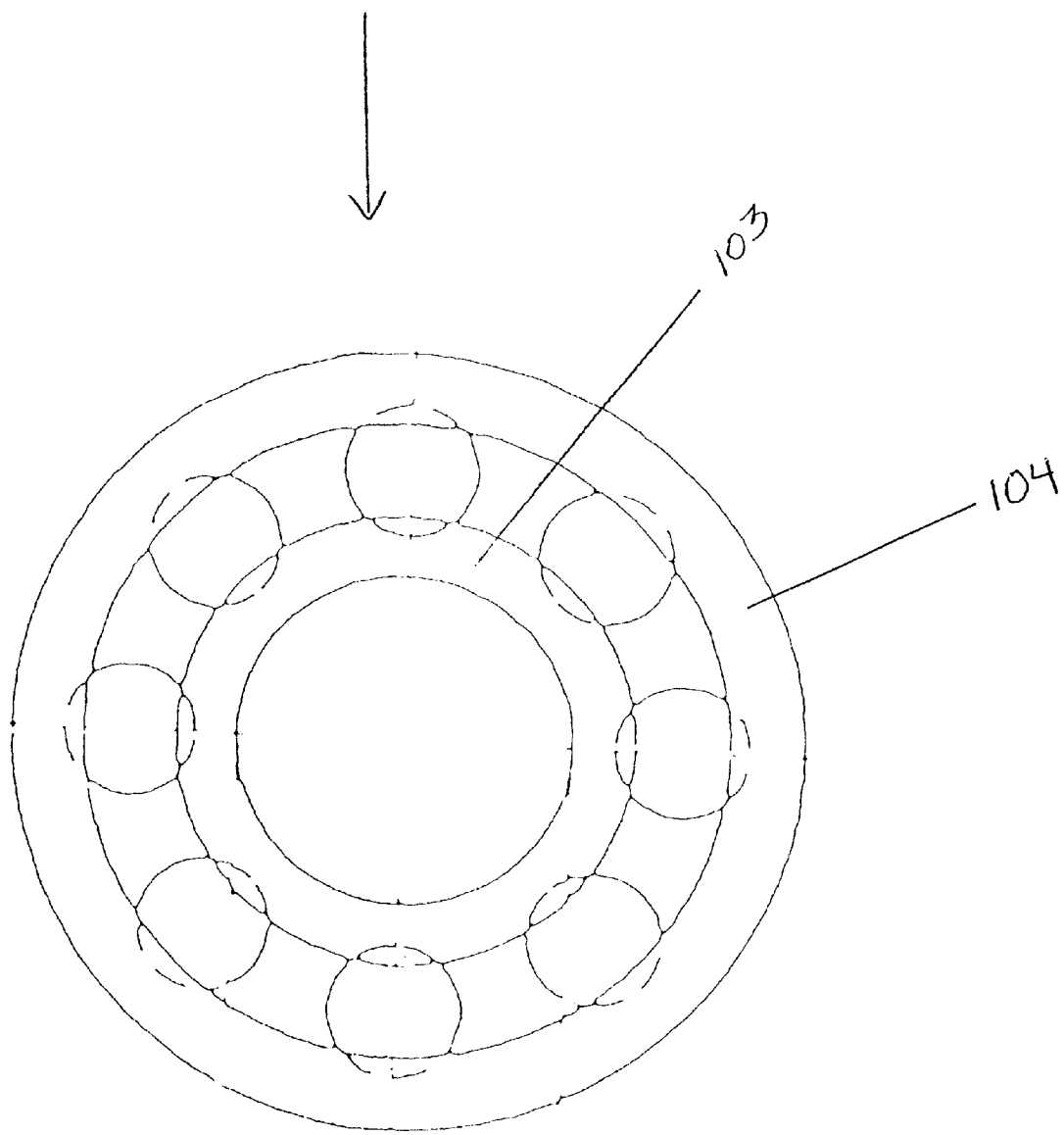
FIG. 9 is a top view of the blade and pulley end bearing used in the quill assembly of FIG. 1.
Figure 10:
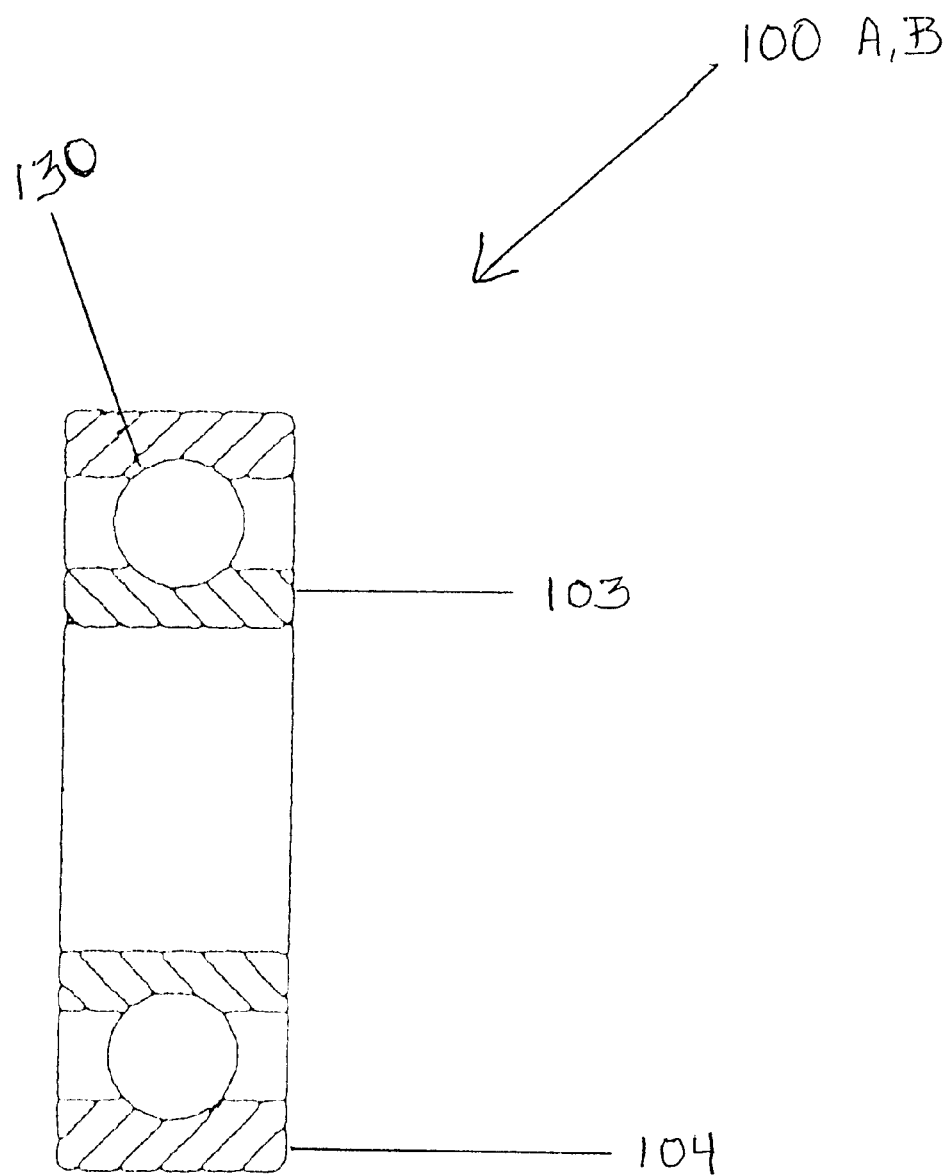
FIG. 10 is a cutaway side view of the bearing of FIG. 9.

The bearings 100A and 100B are shown in FIGS. 9 and 10. The bearings are conventional ball bearings with balls 130 held in a race formed between an inner ring 103 and an outer ring 104. In one embodiment, the bearings 100A and 100B are type 6203-2RS, with Buna-N double lip seals, electric motor quality (EMQ), C4 internal fit, Chevron SRI-2 grease, and are classified ABEC 1.

Figure 11:
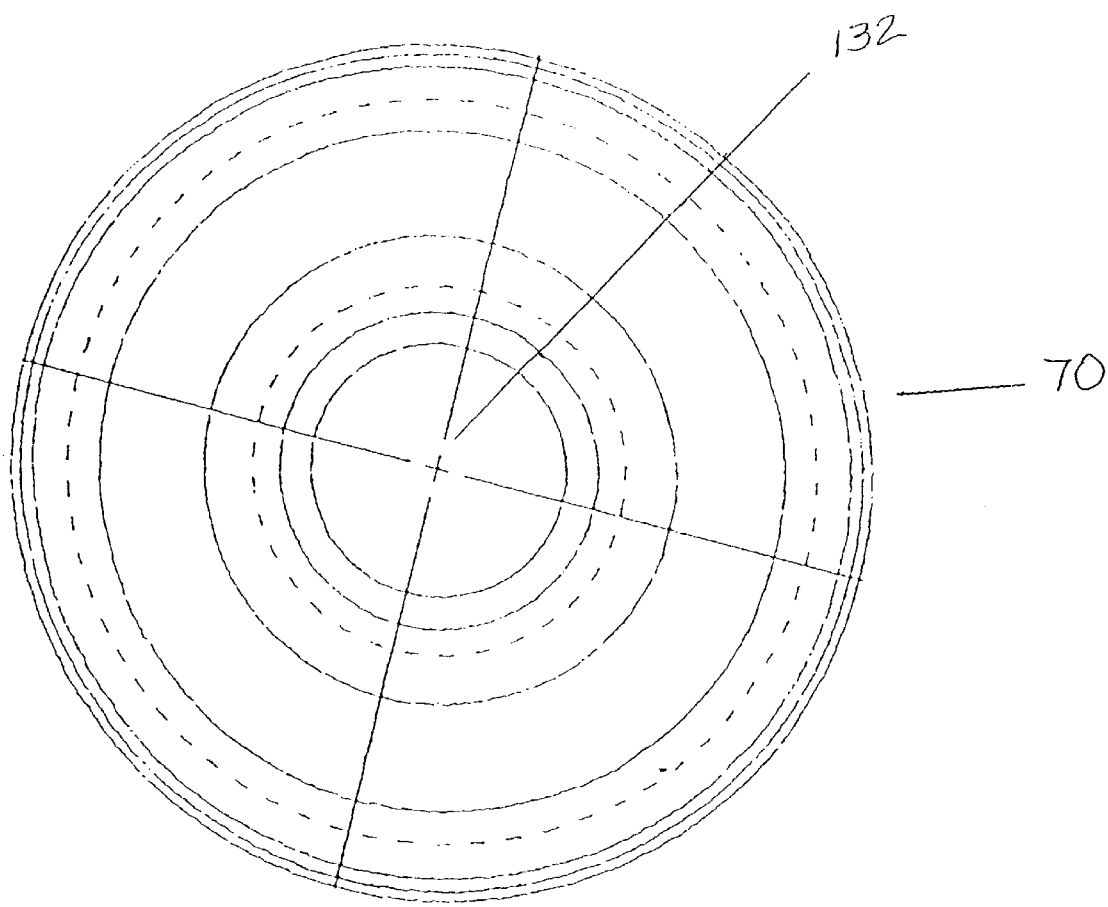
FIG. 11 is a top view of the blade adapter used in the quill assembly of FIG. 1.
Figure 12:
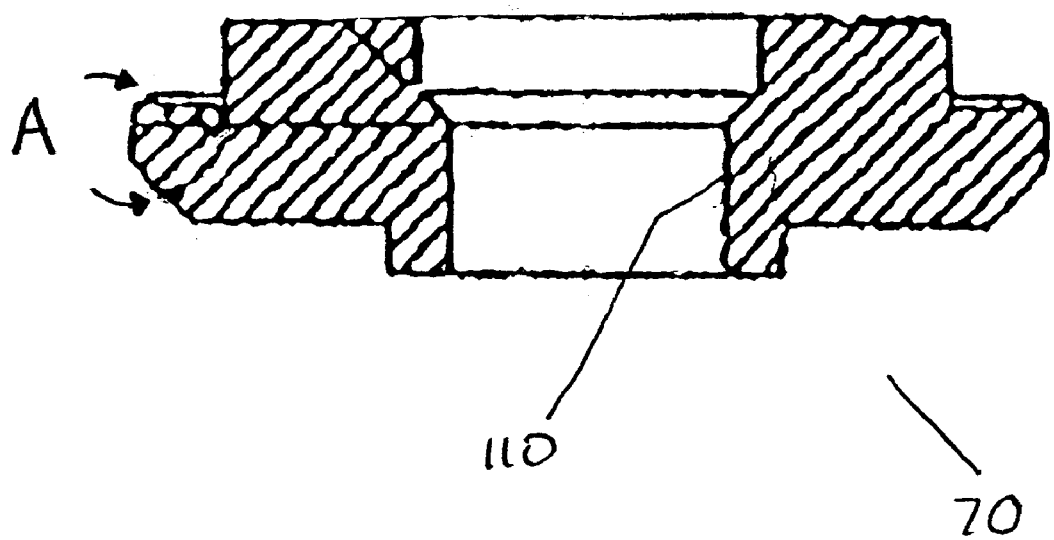
FIG. 12 is a cutaway side view of the blade adapter of FIG. 11.
Figure 13:
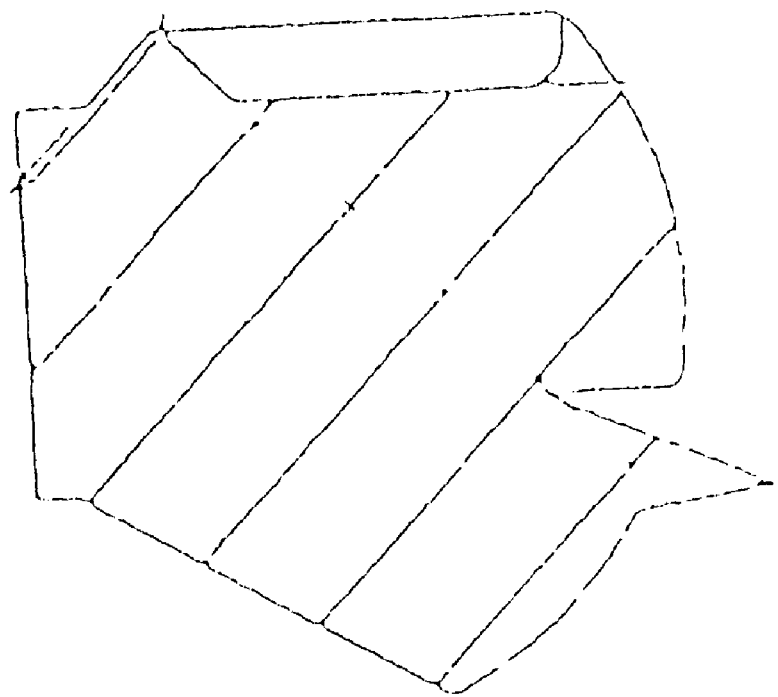
FIG. 13 is an enlarged view of segment A of the blade adapter of FIGS. 11 and 12.

FIGS. 11–13 show the blade adapter 70. The blade adapter 70 is recessed into the bottom bearing bore 102B and counter-bore 108 (FIG. 4) in the housing 73. The counter-bore 108 is larger than the bottom bearing bore 102B that results in a labyrinth type seal. In the prior art, bearings located on the blade end of the quill assemblies frequently fail due to the introduction of foreign debris. The novel blade adapter 70 of this assembly 10 eliminates most of these failures.

The blade adapter 70 has a central bore 110 with a diameter sized to create a press fit onto the blade end 121 of the jackshaft 15. This insures that the blade adapter 70 will not fall off the assembly 10 prior to installation of the blade. Preferably, the central bore 110 is splined as shown in FIG. 12 to fit splined portion 111 of the blade end 121 of jackshaft 15. This ensures that the adapter 70 is always turning with the jackshaft 15.

The blade adapter 70 is also provided with a predetermined vertical dimension to position the blade at the correct height.

Figure 14:
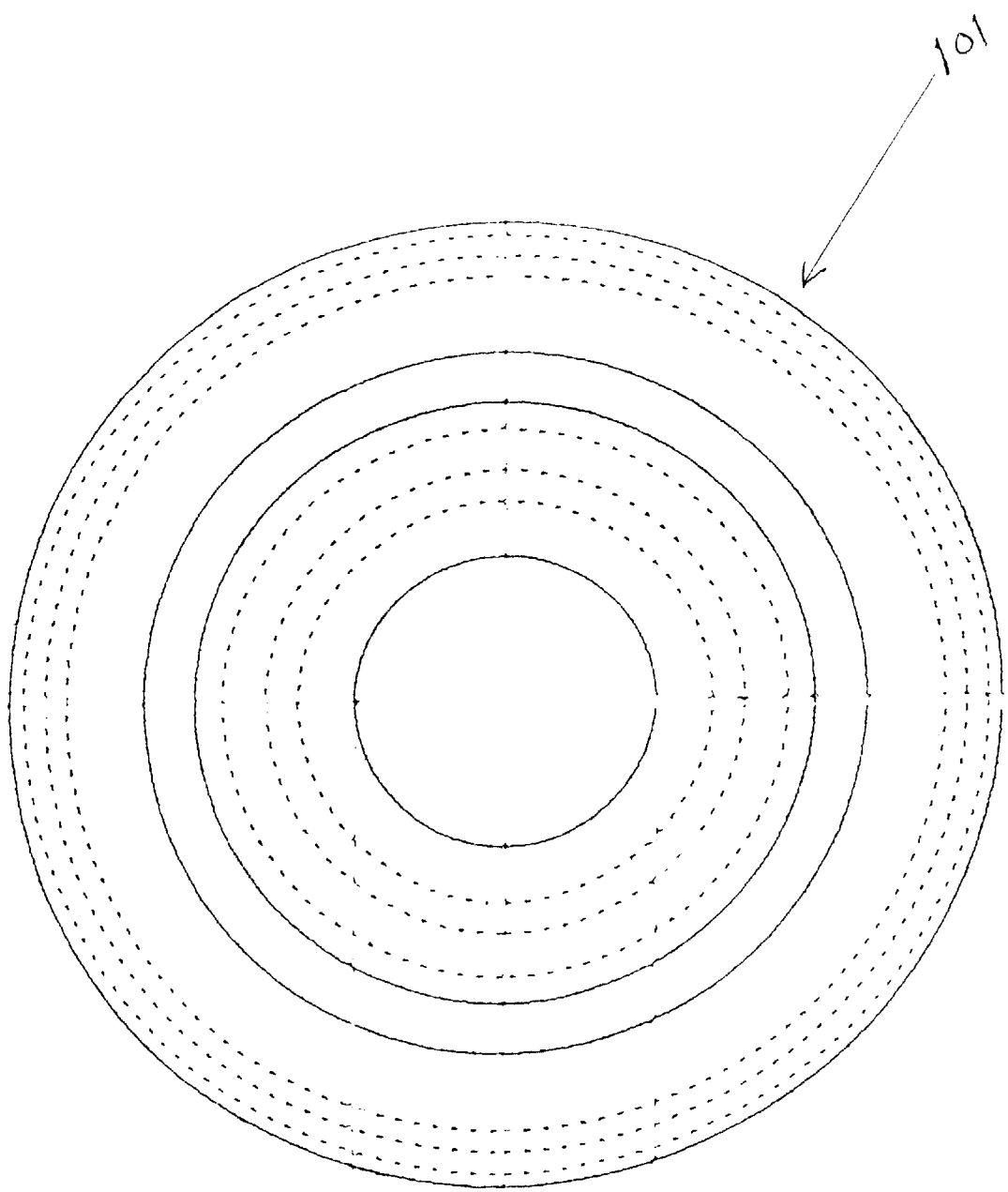
FIG. 14 is a top view of the pulley adapter with integral spacer used in the quill assembly of FIG. 1.
Figure 15:
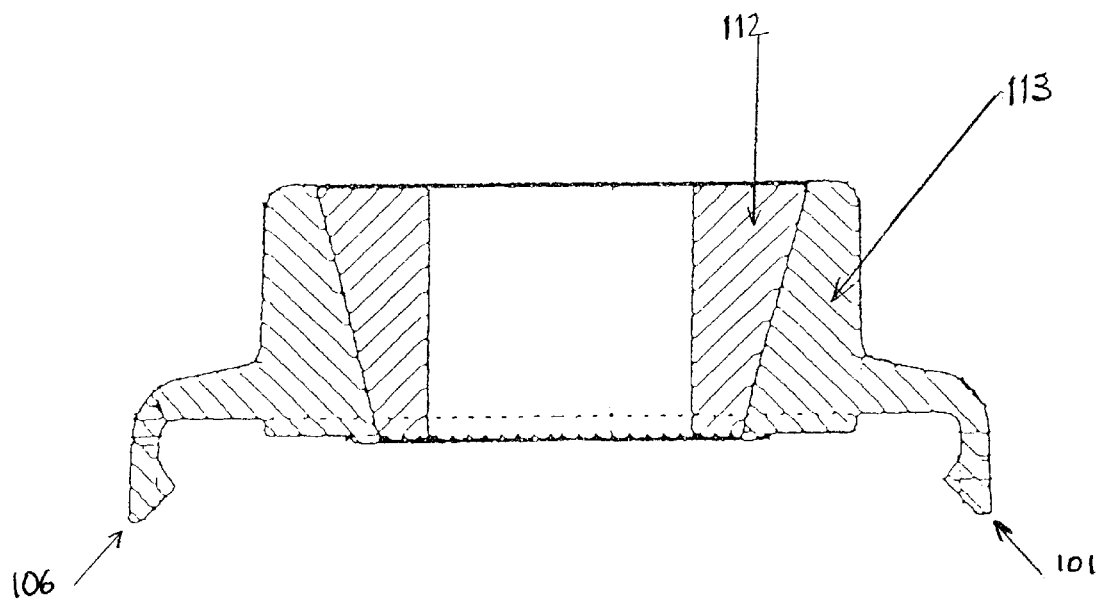
FIG. 15 is cutaway side view of the pulley adapter/spacer of FIG. 14.

Looking now at FIGS. 14 and 15, the pulley adapter 101 preferably includes a metal center section 112 and a resilient rubber outer section 113. As seen in FIG. 1, the pulley adapter 101 slips over the pulley end 120 of jackshaft 15. The center section 112 extends upwardly away from the top end 75 of the housing 73 a pre-determined vertical distance, acting as a spacer to locate the pulley at the correct height without the need for a separate spacer.

The resilient outer section 113 covers the entire top end 75 of the housing 73 and includes a lip 125 that fits into the groove 107 (FIG. 4) to seal the top of the assembly 10 and shed water away from the top bearing 100A. In the prior art, bearing failures on the pulley end (the top of the assembly) are prone to damage from water entering into the bearing. The rubber lip 125 also acts as a retainer so that the pulley adapter 101 does not fall off prior to installation of the pulley.

Thus, although there have been described particular embodiments of the present invention of a new and useful Heavy Duty Quill Assembly for a Lawn Mower, it is not intended that such references be construed as limitations upon the scope of this invention except as set forth in the following claims.

What is claimed is:

1. A quill assembly for use in a lawn mower for transferring power from a belt drive connected to a pulley at the top of the assembly to a rotating cutting blade connected at the bottom of the assembly, the quill assembly comprising:

a. a housing having a central bore extending from a top of the housing to a bottom of the housing;

b. a bottom bearing supported by a seat within a bottom bearing bore at the bottom of the housing;

c. a top bearing having an outer ring supported by a seat within a top bearing bore at the top of the housing;

d. a jackshaft having a center portion positioned within the central bore of the housing and supported for rotary operation by the top and bottom bearings, a blade end of the jackshaft extending from the bottom of the housing and a pulley end of the jackshaft extending from the top of the housing;

e. a pulley adapter adjoining the top of the housing, the pulley adapter having a center section with a central bore positioned around the pulley end of the jackshaft in a slip-fit engagement and an adjacent outer section with a flexible outer lip extending over and sealing the top of the housing, the flexible outer lip being flexible enough to bend when it contacts the housing; and f. a blade adapter recessed into a blade adapter counter-bore at the bottom of the housing, the blade adapter having a central bore surrounding the blade end of the jackshaft.

2. The quill assembly of claim 1 wherein the blade adapter counter-bore is larger than the bottom bearing bore such that the blade adapter engages the housing to form a seal for the bottom bearing.

3. The quill assembly of claim 1 further comprising an annular groove formed around the housing proximate the top of the housing, the groove receiving the outer lip of the pulley adapter.

4. The quill assembly of claim 1 wherein the top bearing bore has a diameter sized to define a slip fit engagement between the top bearing and the top bearing bore whereby the top bearing floats within the top bearing bore.

5. The quill assembly of claim 1 wherein the center portion of the jackshaft has a larger diameter than the blade and pulley ends to form top and bottom shoulders on the jackshaft that support respective inner rings of the top and bottom bearings.

6. The quill assembly of claim 5 wherein the top and bottom shoulders on the jackshaft are positioned at predefined locations along the jackshaft such that the top and bottom bearings are supported at predefined vertical positions along the jackshaft without the use of separate bearing spacers.

7. The quill assembly of claim 1 wherein the center section of the pulley adapter Q extends upwardly from the top of the housing to support a pulley at a pre-defined vertical position above the assembly without the use of a separate pulley spacer.

8. The quill assembly of claim 1 wherein the bottom bearing has an outer diameter forming a press fit engagement between the bottom bearing and the bottom bearing bore.

9. The quill assembly of claim 1 wherein the central bore of the blade adapter has a diameter forming a press fit engagement with the jackshaft.

10. The quill assembly of claim 2, the blade and blade adapter counter-bore defining a labyrinth seal with respect to the bottom end of the housing.

* * * * *